United States Patent
Pradella et al.

(10) Patent No.: US 8,153,714 B2
(45) Date of Patent: Apr. 10, 2012

(54) PROCESS FOR PRODUCING POLYOLEFIN MOLDED ARTICLES COMPRISING AN ETHYLENE-VINYL ALCOHOL COPOLYMER

(75) Inventors: Fiorella Pradella, Mantova (IT); Piet Roose, Brussels (BE)

(73) Assignee: Basell Poliolefine Italia S.R.L., Milan (IT)

( * ) Notice: Subject to any disclaimer, the term of this patent is extended or adjusted under 35 U.S.C. 154(b) by 973 days.

(21) Appl. No.: 12/086,365

(22) PCT Filed: Nov. 7, 2006

(86) PCT No.: PCT/EP2006/068185
§ 371 (c)(1),
(2), (4) Date: Jun. 11, 2008

(87) PCT Pub. No.: WO2007/068536
PCT Pub. Date: Jun. 21, 2007

(65) Prior Publication Data
US 2010/0266797 A1    Oct. 21, 2010

Related U.S. Application Data

(60) Provisional application No. 60/800,601, filed on May 16, 2006.

(51) Int. Cl.
*C08K 5/00*     (2006.01)
*C08F 16/06*    (2006.01)

(52) U.S. Cl. .......................................... 524/284; 525/60
(58) Field of Classification Search ................... 524/284
See application file for complete search history.

(56) References Cited

U.S. PATENT DOCUMENTS

| | | | |
|---|---|---|---|
| 3,825,629 A | 7/1974 | Hofer et al. | |
| 3,928,510 A | 12/1975 | Hoger et al. | |
| 3,954,847 A | 5/1976 | Hofer et al. | |
| 3,962,175 A | 6/1976 | Hofer et al. | |
| 4,075,163 A | 2/1978 | Hofer et al. | |
| 4,182,725 A * | 1/1980 | Floyd et al. | 524/289 |
| 4,187,212 A | 2/1980 | Zinke et al. | |
| 4,290,941 A * | 9/1981 | Zinke et al. | 524/151 |
| 4,600,746 A | 7/1986 | Schmukler et al. | |
| 5,260,371 A * | 11/1993 | Chen | 525/60 |
| 5,389,709 A | 2/1995 | Itamura et al. | |
| 5,492,953 A | 2/1996 | Itamura et al. | |
| 6,316,114 B1 | 11/2001 | Comer et al. | |
| 6,599,598 B1 * | 7/2003 | Tai et al. | 428/36.6 |
| 6,960,376 B2 | 11/2005 | Tai et al. | |
| 2008/0003390 A1 * | 1/2008 | Hayashi et al. | 428/36.6 |

FOREIGN PATENT DOCUMENTS

| | | |
|---|---|---|
| EP | 401666 | 12/1990 |
| EP | 1033080 | 9/2000 |
| GB | 1372528 | 10/1974 |
| WO | 93/02134 | 2/1993 |
| WO | WO 9302134 A1 * | 2/1993 |

* cited by examiner

*Primary Examiner* — Ling Choi
*Assistant Examiner* — Hui Chin
(74) *Attorney, Agent, or Firm* — Dilworth IP LLC

(57) ABSTRACT

A process for producing polyolefin articles comprising an ethylene-vinyl alcohol copolymer, wherein the polyolefin component is melted and mixed with the ethylene-vinyl alcohol copolymer in the presence of a stabilizing composition comprising: a) one or more acid scavengers in amounts equal to or higher than 300 ppm by weight with respect to the weight of the polyolefin component; and b) one or more phenolic antioxidants in amounts equal to or higher than 1100 ppm by weight with respect to the weight of the polyolefin component.

14 Claims, No Drawings

PROCESS FOR PRODUCING POLYOLEFIN MOLDED ARTICLES COMPRISING AN ETHYLENE-VINYL ALCOHOL COPOLYMER

The present invention relates to a process for producing molded articles comprising a mixture of an olefin resin and an ethylene-vinyl alcohol copolymer (hereinafter often referred to as "EVOH").

Various kinds of articles can be prepared by molding a mixture, obtained by melt-mixing, of an olefin resin (in particular polypropylene or polyethylene) and EVOH. In particular, EVOH is used in multi-layer packaging applications to obtain a gas barrier for food containers, as explained for instance in U.S. Pat. No. 6,316,114.

However, the main problem to be solved in the industrial preparation of the said articles is the chemical and thermal degradation of EVOH.

In fact EVOH is very reactive. In particular, when melt-mixed with polyolefins it can react with catalyst residues (deriving from the polymerization processes), especially chlorides. This results in the formation of black spots.

Moreover, EVOH easily sticks to the barrel of the melt-processing apparatuses and starts to degrade. After a while it becomes brown/black and it comes back into the polymer melt, thus resulting again in the formation of black spots.

Actually, an investigation carried out on those spots revealed the presence of an incompatible thin layer of oxidised EVOH, thus confirming that they are caused by the said degradation phenomena.

As a result, physical and optical properties are worsened, mainly due to the appearance of the said black spots.

Such a problem becomes particularly critical when scraps and other recycle materials already containing EVOH, generally called "regrind", are used in the preparation of the said articles.

Therefore there is a strong need for technical solutions able to prevent/reduce the brown spots formation.

Thus an object of the present invention is to provide a process for producing polyolefin molded articles comprising an ethylene-vinyl alcohol copolymer, wherein the polyolefin component is melted and mixed with the ethylene-vinyl alcohol copolymer in the presence of a stabilizing composition comprising:
a) one or more acid scavengers in amounts equal to or higher than 300 ppm, preferably from 600 to 1500 ppm by weight with respect to the weight of the polyolefin component; and
b) one or more phenolic antioxidants in amounts equal to or higher than 1100 ppm, preferably from 1400 to 3000 ppm by weight with respect to the weight of the polyolefin component.

Thanks to the presence of the said additives, the occurrence of black spots is avoided or at least strongly reduced, even when articles with relatively large thickness (100-500 µm or more), like bottles sheets and foils, are produced by using regrind materials containing high amounts of EVOH.

The said effects are remarkably enhanced when the process of the present invention is carried out in the presence, in addition to components a) and b), of one or more phosphorus-containing melt stabilizers c).

Preferred amounts of such component c), optionally used in the melting and mixing step(s) of the process of the present invention, are equal to or higher than 1000 ppm, more preferably from 1000 to 3000 ppm, in particular from 1300 to 2500 ppm by weight with respect to the weight of the polyolefin component.

EVOH copolymers particularly suited for use in the process of the present invention are generally obtainable by saponifying an ethylene-vinyl ester copolymer, in particular by saponifying an ethylene-vinyl acetate copolymer. The ethylene content of the EVOH is preferably from 5 to 60 mol %, more preferably from 15 to 55 mol %. The degree of saponification of the vinyl acetate moieties is preferably 80 to 100 mol %. In order to achieve high gas barrier properties, the degree of saponification is more preferably 95 mol % or more, still more preferably 98 mol % or more, in particular 99 mol % or more. The EVOH may also contain ethylenically unsaturated monomers such as propylene, 1-butene, isobutene, unsaturated acids such as acrylic acid, methacrylic acid, crotonic acid, phthalic acid, maleic acid, itaconic acid or their derivatives, acrylamides such as acrylamide, N-alkylacrylamides, methacrylamides such as methacrylamide, N-alkylmethacrylamides, N,N-dimethyl methacrylamide, 2-methacrylamidepropanesulfonic acid or salts thereof, methacrylamidepropyldimethylamine or salts thereof, N-vinylamides such as N-vinylpyrrolidone, N-vinylformamide, N-vinylacetamide, cyanated vinyls such as acrylonitrile, methacrylonitrile, vinyl ethers such as alkylvinyl ethers hydroxyalkylvinyl ether, alkoxyalkylvinyl ethers, halogenated vinyls.

The EVOH can also contain minor amounts (generally up to 0.5 mol %) of a vinylsilane comonomer, like vinyltrimethoxysilane and vinyltriethoxysilane.

The said EVOH copolymers typically have melt indices ranging from about 0.1 to 50 g/10 min., measured according to ASTM test D-1238 L, using a weight of 2.16 kg and a temperature of 230° C.

Generally, the polyolefins that can be used in the process of the present invention are polymers or copolymers, and their mixtures, of R—CH=CH$_2$ olefins where R is a hydrogen atom or a C$_1$-C$_8$ alkyl radical, or an aryl (in particular phenyl) radical, such as for example 1-butene, 1-hexene, 1-octene, 4-methyl-1-pentene.

Particularly preferred are the following polymers:
A) isotactic, mainly isotactic or atactic propylene homopolymers, the isotactic homopolymers having preferably an isotactic index higher than 80;
B) crystalline copolymers of propylene with ethylene and/or C$_4$-C$_{10}$ α-olefins of the above formula, where R is a C$_2$-C$_8$ alkyl or an aryl (in particular phenyl) radical, wherein the total comonomer content ranges from 0.05% to 20% by weight, or mixtures of said copolymers with isotactic or mainly isotactic propylene homopolymers;
C) elastomeric copolymers of ethylene with propylene and/or a C$_4$-C$_{10}$ α-olefin of the said formula, generally containing from 20 to 80% by weight of ethylene, and optionally containing minor quantities (indicatively, from 0.5 to 15% by weight) of a diene, such as butadiene, 1,4-hexadiene, 1,5-hexadiene, ethylidene-norbornene;
D) homopolymers and copolymers of ethylene, in particular HDPE, LDPE, LLDPE;
E) styrene polymers.

Preferred values of Melt Flow Rate (MFR, according to norm ISO 1238L) and viscosity [η] of the fraction soluble in xylene at room temperature (about 25° C.) for the said olefin polymers and their mixtures are:
MFR: 0.05-3000 g/10 min.;
Xylene soluble intrinsic viscosity [η]:0.5-7.5 dl/g.

A specific example of propylene polymers, falling within the definitions of A) and B) above, is represented by crystalline propylene homopolymers and copolymers having a flexural modulus (measured according to ASTM D 790 at 23° C.) greater than or equal to 1800 MPa, preferably greater than or equal to 1900 MPa, most preferably greater than or equal to 2000 MPa. Such homopolymers and copolymers generally have an isotactic index greater than or equal to 94%, more preferably greater than or equal to 96%, measured in xylene at 25° C. In fact, by polymerizing in one or more stages with highly stereospecific Ziegler-Natta catalysts, one can obtain crystalline propylene homopolymers and copolymers having flexural modulus values even higher than 2000 MPa in correspondence to the above mentioned isotactic index values. Moreover, the molecular weight distribution of the above mentioned high modulus propylene polymers is generally broad, preferably with Mw/Mn values ranging from 7 to 30 (wherein Mw and Mn refer to the weight average molecular weight and number average molecular weight respectively, measured by Gel Permeation Chromathography).

In order to maintain high flexural modulus values it is better that the content of comonomers in the copolymers be low, generally less than or equal to 10% by weight, in particular less than or equal to 5% by weight.

In addition to the said polyolefins, the polyolefin component employed in the process of the present invention can contain a portion (generally, when present, from 1 to 10% by weight referred to the total weight of the polyolefin component) of a functionalized polyolefin, generally a carboxylic group modified polyolefin.

The said carboxylic group modified polyolefin is generally the product of grafting the previously said polyolefins with a carboxylic acid or its derivatives (in particular anhydrides). Said carboxylic acids and derivatives thereof include, among others, maleic acid, acrylic acid, itaconic acid, crotonic acid, maleic anhydride and itaconic anhydride. Among these, maleic anhydride is particularly preferred.

The grafting reaction is generally carried out by treatment of the starting polyolefin in the molten state with generators of free radicals (organic peroxides) and the monomer compound (the carboxylic acid or derivative) to be grafted. Preferably the carboxylic group content in the grafted polyolefin is from 0.005% to 1%, more preferably from 0.01% to 0.6% by weight.

Such functionalized polyolefins are used to improve the dispersion of the EVOH copolymer in the polyolefin materials, and/or for intermediate tie layers in the multilayer articles (typically to bond EVOH-containing layers to polyolefin layers), so that they are often found in the regrind in the above said amounts.

According to the process of the present invention, the EVOH copolymer component is mixed with the polyolefin component in weight amounts from 2 to 60%, preferably from 5 to 55% of EVOH copolymer with respect to the total weight of the two components.

Any compound known in the art which is effective in neutralization of acid substances present in plastics (particularly in polyolefins), thus reducing or avoiding the typical effects of acidic residues (generally deriving from the polymerization catalysts), like corrosion of metals, can be used as component a) in the process of the present invention.

Preferably, the acid scavengers a) used in the process of the present invention are selected from the group consisting of metal salts of carboxylic acids and hydrotalcite.

In particular, the metal salts of carboxylic acids can be selected among the metal salts of propanoic acid, benzoic acid and metal salts of fatty acids.

The metal component of the said salts is not particularly critical, but it is generally selected from alkali metals, such as sodium and potassium, alkaline earth metals, such as magnesium, calcium and barium, and zinc.

Examples of carboxylic acids other than propanoic acid include n-butyric acid, isobutyric acid, pentanoic acid, heptanoic acid, octanoic acid, nonanoic acid, lauric acid, tridecylic acid, myristic acid, pentadecylic acid, palmitic acid, heptadecylic acid, stearic acid, nonadecanoic acid.

Specific examples of metal salts of the above said carboxylic acids are calcium octanoate, calcium stearate, zinc stearate and sodium benzoate.

Examples of hydrotalcites include the hydrated carbonate minerals, generally represented by the formula:

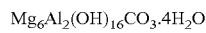

$Mg_6Al_2(OH)_{16}CO_3 \cdot 4H_2O$ and synthetic hydrotalcites generally represented by the formula:

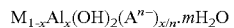

$M_{1-x}Al_x(OH)_2(A^{n-})_{x/n} \cdot mH_2O$ wherein M is Mg, Ca or Zn, $A^{n-}$ is an anion of n valency, such as, $Cl^-$, $Br^-$, $I^-$, $NO_3^-$, $ClO_4^{2-}$, $SO_4^{2-}$, $CO_3^{2-}$, $SiO_3^{2-}$, $HPO_4^{2-}$ and $PO_4^{2-}$, x is a number from 0 to 0.5, and m is a number from 0 to 2.

The antioxidants b) used in the process of the present invention are generally all the phenolic stabilizers known in the art as antioxidants. Such phenolic antioxidants are generally characterized by the presence, in their structure, of one or more sterically hindered phenolic groups, i.e., groups having at least one substituent which is not hydrogen, preferably a $C_{3-30}$ branched alkyl radical, in the ortho position with respect to the hydroxyl group.

Examples of the above compounds are the phenol compounds of formula:

(I)

where R' is a —$CHR_2$ or —OR radical; the R radicals, both in formula (I) and in R', equal or different, are hydrogen, or $C_{1-30}$ linear or branched alkyl radicals; $C_{3-30}$ cycloalkyl; $C_{6-30}$ aryl, $C_{7-30}$ alkaryl or aralkyl; or $C_{1-30}$ alcoxyl radicals; one or more of said R radicals can optionally contain functional groups, particularly piperidine or —COOR"; —O—; —S—; —NHR"; —NHR"—NHR"; —OR" groups, where R" is selected from hydrogen, or $C_{1-30}$ linear or branched alkyl; $C_{3-30}$ cycloalkyl; $C_{6-30}$ aryl, $C_{7-30}$ alkaryl or aralkyl; or two or more of the R and R' radicals are bonded to form cyclic structures; provided that at least one of the two R radicals in the ortho position with respect to the —OH group in formula (I) is not hydrogen; or the phenolic antioxidants comprising two or more structural units of formula (I) where the R and R' radicals have the above mentioned meaning, with the difference that at least one of them is substituted by a direct bond or a —O— or —S— functional group, or by a polyvalent linear or branched $C_{1-30}$ alkyl; $C_{3-30}$ cycloalkyl; $C_{6-30}$ aryl; $C_{7-30}$ alkaryl or aralkyl radical, said polyvalent radicals optionally containing the above mentioned functional groups, and where all the valences are saturated by structural units of formula (I).

Specific example of the above mentioned phenolic antioxidants are: 2,6-di-tert-butyl-4-methylphenol; 2-tert-butyl-4,6-dimethylphenol; 2,6-di-tert-butyl-4-ethylphenol; 2,6-di-tert-butyl-4-isoamylphenol; 2,6-dicyclopentyl-4-methylphenol; 2-tert-butyl-4,6-diisopropylphenol; 2-tert-butyl-4,6-dioctadecylphenol; 2,6-di-tert-butyl-4-methoxymethylphenol; 2,5-di-tert-butylhydroquinone; 2,6-dicyclohexylhydroquinone; 2,6-di-tert-butyl-4-hexadecyloxyphenol; 4,4'-thiobis(6-tert-butyl-2-methylphenol); 2,2'-methylene-bis(6-tert-butyl-4-methylphenol); 4,4'-methylene-bis(2,6-di-tert-butylphenol);

1,1-bis(5-tert-butyl-4-hydroxy-2-methylphenyl)butane; 3(3,5-di-tert-butyl-4-hydroxyphenyl)propionate of octadecylmethyl; 3(3,5-dicyclohexyl-4-hydroxyphenyl)propionate of ethyl or octadecyl; 1,3,5-trimethyl-2,4,6-tris(3',5'-ditert-butyl-4-hydroxybenzyl)benzene; tetrakis[methylene(3,5-di-tert-butyl-4-hydroxyhydrocinnamate)]methane; 2,2-bis[4-(2-(3,5-di-tert-butyl-4-hydroxycinnamoyloxy)ethoxyphenyl] propane; pentaerythritol-tetrakis[3-(3,5-di-tert-butyl-4-hydroxyphenyl)propionate, 2-[1-(2-hydroxy-3,5-di-tert-pentylphenyl)ethyl]-4,6-di-tert-pentylphenyl]acrylate, sold by Sumitomo Chemical under the Sumilizer GS trade-mark. Examples of preferred phenolic antioxidants are: 2,6-di-tert-butyl-4-methylphenol, sold by Degussa under the Ionol trademark; 2,2-bis(4-(2-(3,5-di-tert-butyl-4-hydroxyhydrocinnamoyloxy))ethoxyphenyl)propane; octadecyl 3-(3,5-di-tert-butyl-4-hydroxyphenyl)-propionate, sold by Ciba Specialty Chemicals under the Irganox 1076 trade-mark; and pentaerytrityl tetrakis 3-(3,5-di-tert-butyl-4-hydroxyphenyl)propanoate, sold by Ciba Specialty Chemicals under the Irganox 1010 trade-mark.

Particularly preferred for use in the process of the present invention are the phenolic antioxidants which substantially display their stabilization effect in an oven ageing test, according to method ASTM D 3012, at a temperature higher than 120° C.

Examples of such kind of stabilizers are pentaerytrityl tetrakis 3-(3,5-di-tert-butyl-4-hydroxyphenyl)propanoate and octadecyl 3-(3,5-di-tert-butyl-4-hydroxyphenyl)-propionate.

Any phosphorus-containing compound, in particular selected from organic phosphates and phosphonites, known in the art as stabilizer against melt degradation of polymers, can be used as component c).

Examples of organic phosphites that can be used as component c) in the process of the present invention, are the compounds having the following general formulas:

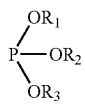
(II)

where $R_1$, $R_2$, $R_3$, equal or different, are alkyl, aryl, or arlakyl radicals having 1 to 18 carbon atoms;

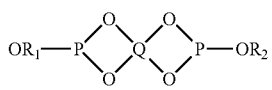
(III)

where $R_1$ and $R_2$, equal or different, are radicals having the meaning indicated above; Q is a tetravalent alkyl radical;

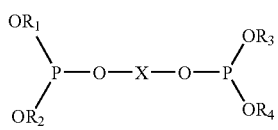
(IV)

where $R_1$, $R_2$, $R_3$, $R_4$, equal or different, are radicals having the meaning already indicated for the R radicals, X is a bivalent alkyl, aryl, or aralkyl radical.

Examples of organic phosphites comprised in general formula II are described in U.S. Pat. Nos. 4,187,212, and 4,290,941.

Specific examples of compounds comprised in general formulas II, III, and IV are: tris(2,4-di-tert-butylphenyl)phosphite marketed by Ciba Specialty Chemicals under the trademark Irgafos 168; distearyl pentaerythritol diphosphite marketed under the trademark Weston 618; 4,4'-butylidene bis(3-methyl-6-tert-butylphenyl-di-tridecyl)phosphite marketed by ADEKA PALMAROLE under the trademark Mark P; tris(mononylphenyl)phosphite; bis(2,4-di-tert-butyl)-pentaerithritol diphosphite, marketed under the trademark Ultranox 626.

Examples of organic phosphonites that can be used as component c) in the process of the present invention, are the compounds of general formula:

(V)

where $R_1$, $R_2$, $R_3$, equal or different, are alkyl, aryl, or aralkyl radicals having 1 to 18 carbon atoms.

In turn, the $R_3$ radical can be substituted with a group

(VI)

where $R_4$ and $R_5$, equal or different, are radicals having the meaning indicated above for the R radicals, and X is a bivalent alkyl, aryl, or aralkyl radical.

Examples of organic phosphonites comprised in general formula V are described in GB patent 1,372,528.

A specific example of compounds comprised in general formula V is the tetrakis(2,4-di-tert-butylphenyl)4,4'-diphenylilenediphosphonite.

The said components a), b) and c) can be added in any convenient way.

In particular they can be added to the polyolefin component in the said amounts (using conventional compounding techniques), before the melting and mixing step(s) of the process of the present invention.

For example, when regrind is used, such components can be present in the regrind fraction coming from one or more layers of the ground articles (like films or bottles), either comprising polyolefin materials, EVOH or both.

In fact, in the manufacturing process for production of the said articles, it is possible and convenient to add the said stabilizer components to the polyolefin materials even when used for producing layers which do not contain the EVOH copolymer, so that the regrind coming from scraps will already contain the a), b) and c) amounts required by the process of the present invention, thus making it possible to produce finished articles continuously, without occurrence of undesired amounts of black spots.

Thus another object of the present invention is constituted by polyolefin compositions for use in the process of the present invention, comprising one or more polymers or copolymers of olefins having formula R—CH=CH$_2$, wherein R is hydrogen or an alkyl radical, linear or branched, with 2-8 carbon atoms or an aryl (in particular phenyl) radical, and a stabilizing composition comprising, in ppm by weight with respect to the polyolefin composition:

a) one or more acid scavengers in amounts equal to or higher than 300 ppm, preferably from 600 to 1500 ppm;
b) one or more phenolic antioxidants in amounts equal to or higher than 1100 ppm, preferably from 1400 to 3000 ppm; and optionally,
c) one or more phosphorus-containing melt stabilizers in amounts equal to or higher than 1000 ppm, preferably from 1000 to 3000 ppm, more preferably from 1300 to 2500 ppm.

The process of the present invention can be carried out by using methods and apparatuses well known in the art of processing polymers.

Thus, the melting and mixing step(s) can be carried out in the extruders normally used for processing the thermoplastic polymers, in particular polyolefins. Suitable extruders commonly known in the art include single-screw extruders, traditional and CoKneader (like the Buss), twin corotating screw extruders, mixers (continuous and batch). Such extruders are preferably equipped with separate feeding systems for the materials to be fed (for instance, the regrind and virgin polymers). The temperature in the extruders preferably ranges from 100° C. to 260° C., more preferably from 160 to 230° C. By operating at such temperatures, melting and mixing is achieved.

If a premixing step is carried out, any apparatus used in the art can be adopted, preferably medium and high speed mixers like Nauta mixer, Mixaco and Turbomixers.

Downstream the melting and mixing step(s), the molten polymer is processed according to known techniques, to prepare the desired finished articles.

Thus the extruders can be for instance equipped with flat or annular extrusion dies, to produce films, sheets and bottles.

All the commonly employed techniques, like coextrusion and blow-molding, can be used to produce mono- and multilayer articles.

The particulars are given in the following examples, which are given to illustrate, without limiting, the present invention.

EXAMPLES 1-3 AND COMPARATIVE EXAMPLE 1

The following polymer materials and additives are used.
Polymer Materials
PP: random copolymer of propylene containing about 0.4% by weight of ethylene, having MFRL of 4 g/10 min. and isotatcticity index of 97.5%;
EVOH: ethylene-vinyl alcohol copolymer (EVAL T101 B, marketed by EVAL) containing 32% by moles of ethylene, having density of 1.17 g/cm$^3$, and MFRL of 10 g/10 min.;
TIE LAYER: NF 518 E, marketed by Mitsui, consisting of a carboxylic group modified polyolefin.
Additives (Components a) to c))
CaSt: calcium stearate, used as component a);
NaBz: sodium benzoate, used as component a);
Irganox 1010: pentaerytrityl tetrakis 3-(3,5-di-tert-butyl-4-hydroxyphenyl)propanoate, used as component b);
Sumilizer GS: 2-[1-(2-hydroxy-3,5-di-tert-pentylphenyl] ethyl)-4,6-di-tert-pentylphenylkacrylate, used as component b);
Irgafos 168: tris(2,4-di-tert-butylphenyl)phosphate, used as component c);
Irganox B215: blend of about 34% by weight of Irganox 1010 and about 66% by weight of Irgafos 168;
Irganox B225: blend of 50% by weight of Irganox 1010 and 50% by weight of Irgafos 168;
OB 30: paraffinic oil having a density of 0.842 kg/1 at 20° C. according to ASTM D 1298 and flowing point of −10° C. according to ASTM D 97;
DBS: dibenzylidene sorbitol.

The above described polymer materials and additives are mixed together in a rotating drum.

Then the mixed materials so obtained are melt blended in a twin screw extruder Berstorff ZE 25 (length/diameter ratio of screws: 33) and extruded under nitrogen atmosphere in the following conditions:

| Rotation speed: | 250 rpm; |
| Extruder output: | 6-20 kg/hour; |
| Melt temperature: | 200-250° C. |

Two extrusion passes are carried out, after which the MFRL is measured, and haze and black spots content are measured on haze plaques prepared from the product of each pass, while yellowness index is measured on pellets (having diameter of about 3 mm and length of about 5 mm) made of the said products as well. The results are reported in Table 1, together with the amounts of the components subjected to melt-mixing.

Testing Methods

The said plaques for haze measurement, 1 mm thick, are prepared by injection moulding, with injection time of 1 second, temperature of 230° C., mould temperature of 40° C. The injection press is a Battenfeld™ type BA 500CD with a clamping force of 50 tons.

The insert mould leads to the moulding of two plaques (55×60×1 mm each).

Haze

The plaques are conditioned for 12 to 48 hours at R.H. 50±5% and 23±1° C. The apparatus used is a Hunter™ D25P-9 colorimeter. The measurement and computation principle are given in the norm ASTM-D1003.

The apparatus is calibrated without specimen, the calibration is checked with a haze standard. The haze measurement is carried out on five plaques.

Black Spots

By visual assessment. The number of black spots per 100 cm$^2$ is determined on 5 plaques. The reported values are the mean of the 5 counts.

Yellowness Index

Measured according to method ASTM D1925.

TABLE 1

| Example No. | | 1 | 2 | 3 | 1 C |
|---|---|---|---|---|---|
| PP | wt % | 91.9 | 91.8 | 92.05 | 92 |
| EVOH | wt % | 5 | 5 | 5 | 5 |
| TIE LAYER | wt %. | 2.5 | 2.5 | 2.5 | 2.5 |
| CaSt | ppm | 1000 | 1000 | — | 1000 |
| NaBz | ppm | — | — | 1000 | — |
| Irganox 1010 | ppm | 1500 | 1500 | — | — |
| Sumilizer GS | ppm | — | 1000 | — | — |
| Irgafos 168 | ppm | 1000 | 1000 | — | — |
| Irganox B215 | ppm | — | — | — | 1500 |
| Irganox B225 | ppm | — | — | 3000 | — |
| OB 30 | wt % | 0.05 | 0.05 | 0.05 | 0.05 |

TABLE 1-continued

| Example No. | | 1 | 2 | 3 | 1 C |
|---|---|---|---|---|---|
| DBS | wt % | 0.2 | 0.2 | — | 0.2 |
| First extrusion pass | | | | | |
| MFRL | g/10 min. | 3.9 | 3.9 | 3.8 | 4.5 |
| Haze | % | 84.4 | 86 | 85 | 84.2 |
| Black spots | | **** | **** | **** | * |
| Second extrusion pass | | | | | |
| MFRL | g/10 min. | 4.1 | 4 | 4.2 | 4.5 |
| Haze | % | 83.2 | 82.8 | 84 | 84.1 |
| Yellowness Index | | 4.7 | 4.3 | 4 | 5.4 |
| Black Spots | | */ |  | ** | * |

Notes:
*= more than 40 black spots on 100 cm$^2$;
**= 10-40 spots on 100 cm$^2$ (not appearing in the Table);
***= 4-10 spots on 100 cm$^2$;
****= 0-3 spots on 100 cm$^2$;
ppm amounts are by weight, with respect to the total composition.

The invention claimed is:

1. A process for producing polyolefin articles comprising a polyolefin component and an ethylene-vinyl alcohol copolymer present in an amount from 2 to 60% by weight with respect to the total weight of the polyolefin component and the ethylene-vinyl alcohol copolymer, wherein the polyolefin component is melted and mixed with the ethylene-vinyl alcohol copolymer in presence of a stabilizing composition comprising:
   a) at least one acid scavenger in an amount equal to or higher than 300 ppm by weight, with respect to the weight of the polyolefin component;
   b) at least one phenolic antioxidant in an amount equal to or higher than 1100 ppm by weight, with respect to the weight of the polyolefin component; and
   c) at least one phosphorus-containing melt stabilizer, in an amount equal to or higher than 1000 ppm by weight with respect to the polyolefin component,
   the polyolefin component comprising: (i) a propylene polymer, and (ii) a functionalized polyolefin present in an amount from 1 to 10% by weight with respect to the total weight of the polyolefin component.

2. The process of claim 1 comprising from 600 to 1500 ppm by weight of the acid scavenger, with respect to the weight of the polyolefin component.

3. The process of claim 1 comprising from 1400 to 3000 ppm by weight of the phenolic antioxidant, with respect to the weight of the polyolefin component.

4. The process of claim 1, wherein the phosphorus-containing melt stabilizer ranges from 1000 to 3000 ppm by weight, with respect to the weight of the polyolefin component.

5. The process of claim 1, wherein the phosphorus-containing melt stabilizer ranges from 1300 to 2500 ppm by weight, with respect to the weight of the polyolefin component.

6. The process of claim 1, wherein the acid scavenger is selected from the group consisting of metal salts of carboxylic acids, hydrotalcite, and mixtures thereof.

7. The process of claim 6, wherein the acid scavenger is selected from the group consisting of metal salts of propanoic acid, metal salts of benzoic acid, metal salts of fatty acids, and combinations thereof.

8. The process of claim 7, wherein the acid scavenger is stearic acid.

9. The process of claim 1, wherein the phenolic antioxidant is a sterically hindered phenolic compound.

10. The process of claim 9, wherein the hindered phenolic compound performs in an oven ageing test, measured according to method ASTM D 3012 at a temperature higher than 120° C.

11. The process of claim 1, wherein the ethylene-vinyl alcohol copolymer is used in form of regrind.

12. A polyolefin composition comprising a polyolefin component and an ethylene-vinyl alcohol copolymer, wherein the polyolefin component is melted and mixed with the ethylene-vinyl alcohol copolymer in presence of a stabilizing composition comprising:
   a) at least one acid scavenger in an amount equal to or higher than 300 ppm by weight, with respect to the weight of the polyolefin component; and
   b) at least one phenolic antioxidant in an amount equal to or higher than 1100 ppm by weight, with respect to the weight of the polyolefin component.

13. A molded article comprising a polyolefin component and an ethylene-vinyl alcohol copolymer, wherein the polyolefin component is melted and mixed with the ethylene-vinyl alcohol copolymer present in an amount from 2 to 60% by weight with respect to the total weight of the polyolefin component and the ethylene-vinyl alcohol copolymer in the presence of a stabilizing composition comprising:
   a) at least one acid scavenger in an amount equal to or higher than 300 ppm by weight, with respect to the weight of the polyolefin component;
   b) at least one phenolic antioxidant in an amount equal to or higher than 1100 ppm by weight, with respect to the weight of the polyolefin component; and
   c) at least one phosphorus-containing melt stabilizer, in an amount equal to or higher than 1000 ppm by weight with respect to the polyolefin component,
   the polyolefin component comprising: (i) a propylene polymer, and (ii) a functionalized polyolefin present in an amount from 1 to 10% by weight with respect to the total weight of the polyolefin component.

14. A multilayer container, film, or sheet comprising a molded article comprising a polyolefin component and an ethylene-vinyl alcohol copolymer present in an amount from 2 to 60% by weight with respect to the total weight of the polyolefin component and the ethylene-vinyl alcohol copolymer, wherein the polyolefin component is melted and mixed with the ethylene-vinyl alcohol copolymer in presence of a stabilizing composition comprising:
   a) at least one acid scavenger in an amount equal to or higher than 300 ppm by weight, with respect to the weight of the polyolefin component;
   b) at least one phenolic antioxidant in an amount equal to or higher than 1100 ppm by weight, with respect to the weight of the polyolefin component; and
   c) at least one phosphorus-containing melt stabilizer, in an amount equal to or higher than 1000 ppm by weight with respect to the polyolefin component,
   the polyolefin component comprising: (i) a propylene polymer, and (ii) a functionalized polyolefin present in an amount from 1 to 10% by weight with respect to the total weight of the polyolefin component.

* * * * *